United States Patent
Markegaard

(10) Patent No.: US 8,338,760 B2
(45) Date of Patent: Dec. 25, 2012

(54) INDUCTOR FOR INDUCTION HARDENING OF METAL, ROD-SHAPED TOOTHED RACKS

(75) Inventor: Leif Markegaard, Skien (NO)

(73) Assignee: EFD Induction GmbH, Freiburg (DE)

( * ) Notice: Subject to any disclaimer, the term of this patent is extended or adjusted under 35 U.S.C. 154(b) by 554 days.

(21) Appl. No.: 12/593,326

(22) PCT Filed: Mar. 27, 2008

(86) PCT No.: PCT/DE2008/000515
§ 371 (c)(1),
(2), (4) Date: Nov. 13, 2009

(87) PCT Pub. No.: WO2008/116459
PCT Pub. Date: Oct. 2, 2008

(65) Prior Publication Data
US 2010/0059506 A1 Mar. 11, 2010

(30) Foreign Application Priority Data
Mar. 28, 2007 (DE) .......................... 10 2007 015 314

(51) Int. Cl.
*H05B 6/10* (2006.01)
*H05B 23/36* (2006.01)
*H05B 6/04* (2006.01)

(52) U.S. Cl. ........ 219/637; 219/635; 219/672; 219/670; 219/645

(58) Field of Classification Search .................. 219/637, 219/635, 672, 673, 639, 652, 640, 121.43, 219/670, 121.59, 645
See application file for complete search history.

(56) References Cited

U.S. PATENT DOCUMENTS

| | | | |
|---|---|---|---|
| 2,390,559 A | 12/1945 | Sherman | |
| 3,842,234 A | 10/1974 | Seyfried | |
| 5,173,246 A | 12/1992 | Schwarz et al. | |
| 5,345,065 A | 9/1994 | Reinke et al. | |
| 5,406,859 A * | 4/1995 | Belford | 74/31 |
| 5,428,208 A | 6/1995 | Chatterjee et al. | |
| 5,473,960 A | 12/1995 | Sakamoto et al. | |

FOREIGN PATENT DOCUMENTS

| | | |
|---|---|---|
| DE | 12 11 674 B | 3/1966 |
| DE | 38 43 457 C1 | 7/1989 |
| DE | 42 30 897 C1 | 10/1993 |
| DE | 195 30 430 C1 | 4/1996 |
| DE | 100 34 421.6 A1 | 1/2002 |
| JP | 06 264147 A | 9/1994 |

* cited by examiner

*Primary Examiner* — Chuong A. Luu
(74) *Attorney, Agent, or Firm* — Gudrun E. Huckett

(57) ABSTRACT

An inductor for induction hardening of a metallic rod-shaped toothed rack, wherein a first outer surface of the toothed rack provided with the teeth is substantially planar and a remaining second outer surface of the toothed rack in cross-section is profiled, wherein the inductor has a substantially rod-shaped first inductor element that extends parallel to a longitudinal axis of the toothed rack. The first inductor element extends across an entire length of the toothed rack to be hardened along the first outer surface provided with the teeth and hardens the first outer surface of the toothed rack. The toothed rack and the inductor during the hardening process are arranged stationarily.

9 Claims, 1 Drawing Sheet

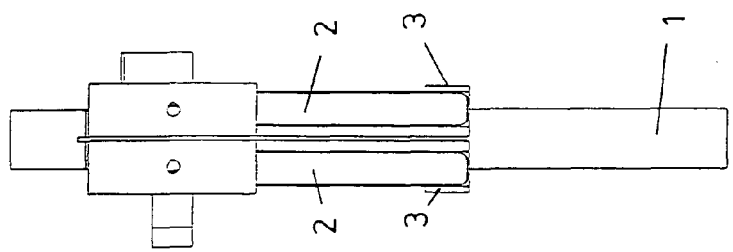
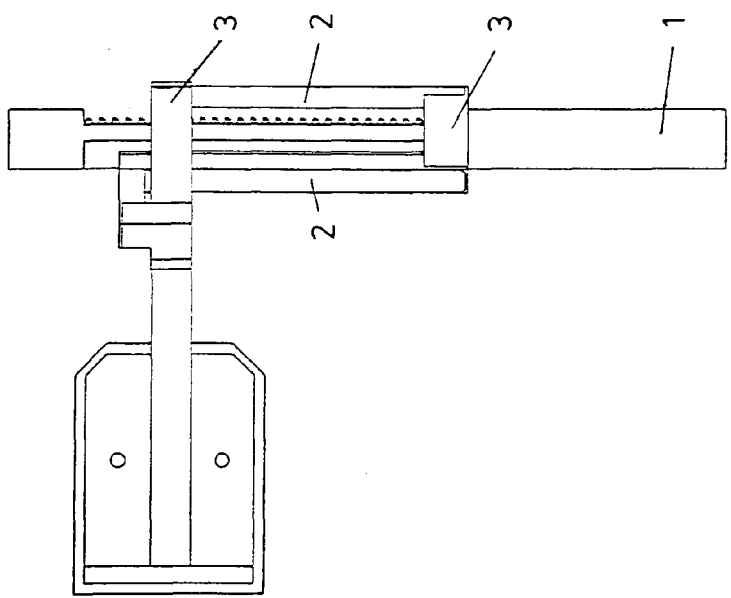
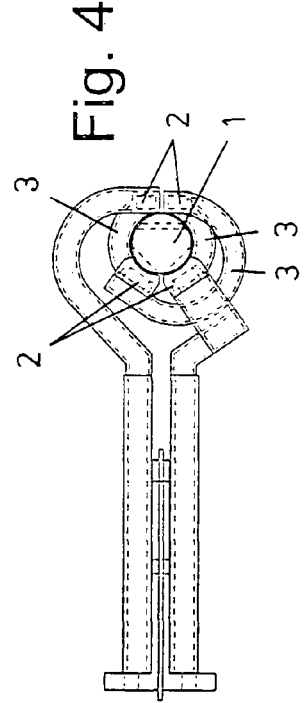
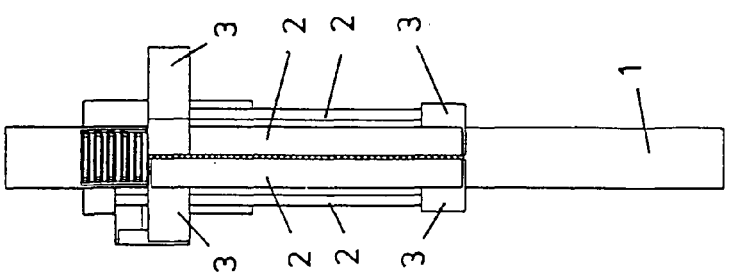

INDUCTOR FOR INDUCTION HARDENING OF METAL, ROD-SHAPED TOOTHED RACKS

The invention concerns an inductor for induction hardening of metallic, rod-shaped toothed racks wherein the outer surface of the toothed rack in the area of the teeth is substantially planar and wherein the remaining outer surface of the toothed rack in cross-section is profiled and wherein during the hardening process the toothed rack is arranged stationarily.

The inductor according to the invention is designed for toothed racks that have a non-round cross-section. Such toothed racks are substantially planar in the area of the teeth that are sequentially arranged behind one another while the remaining cross-sectional contour is profiled, for example, round or substantially oval or rectangular or trapezoidal.

When toothed racks are induction-hardened it is known to arrange the toothed rack stationarily and to move an inductor of a stirrup shape during induction hardening across the length of the toothed rack. This, as a whole, is technically complex and primarily also relatively time-consuming with regard to the processing duration.

Based on this, it is an object of the invention to provide an improved inductor for induction hardening of metallic rod-shaped toothed racks with which the induction process can be performed in a simpler and faster way.

SUMMARY OF THE INVENTION

The technical solution is characterized in that the toothed rack as well as the inductor during the hardening process are arranged stationarily and the inductor is formed of at least one substantially rod-shaped inductor element that extends parallel to the longitudinal axis of the toothed rack, which inductor element extends along the outer surface of the toothed rack provided with the teeth and hardens this given surface area of the toothed rack.

The basic idea of the inductor according to the invention for induction hardening of metallic elongate toothed racks that have a certain cross-sectional profile resides in that the inductor is to be formed in accordance with the given contour of the toothed rack to be hardened of at least one inductor element, preferably of several individual inductor elements. This is to be understood such that the tooth side of the toothed rack to be hardened has correlated therewith an inductor element. Inasmuch as this inductor element is comprised of several individual inductor elements, the sum thereof defines the inductor as a whole. In that the inductor elements are arranged and aligned in the longitudinal direction of the toothed racks, the inductor can be designed such that it extends across the entire length of the elongate toothed rack to be hardened. In this way, it is possible to harden the toothed rack, despite a complex shape, in a targeted way in a single working step. In particular, by means of the configuration of the inductor according to the invention it is possible to arrange in accordance with the present invention the inductor as well as the toothed rack stationarily so that with a single electrical power supply either only the tooth side of the toothed racks or the entire toothed rack (i.e., inclusive of the back) can be hardened without a relative movement between the toothed rack and the inductor being required. With respect to the procedure, known technologies can be employed. For example, the known conventional method steps can be performed, for example, pre-hardening and subsequently the actual hardening step. For example, it is also possible to operate the inductor with one or several frequencies. As a whole, with the inductor according to the invention, on the one hand, the quality of the induction-hardened toothed rack is improved and, on the other hand, the processing duration can be shortened.

According to another embodiment, the tooth side of the toothed rack, for example, can have correlated therewith a pair of rod-shaped inductor elements. By means of an appropriate geometric configuration and arrangement of the rod-shaped inductor elements, it is thus possible to obtain an optimal hardening of the tooth side of the toothed rack.

Another embodiment proposes to not only inductively harden the tooth side of the toothed rack in the afore described manner but also the back of the toothed rack. This is to be understood such that in the area of the back of the toothed rack corresponding rod-shaped inductor elements are provided that extend parallel to the longitudinal axis of the toothed rack and that harden the back of the toothed rack. In this arrangement, also with a single electric power supply the back, and thus the complete toothed rack, is hardened, i.e., the tooth side as well as the back of the toothed rack. The electrical power supply to the inductor elements is realized preferably simultaneously.

Another embodiment proposes in this connection also that inductor element pairs are provided for hardening the back, for example, when the back of the toothed rack in cross-sectional profile is round or oval. Depending on the cross-sectional contour, even more inductors can be provided wherein each contour section has its own rod-shaped inductor element assigned to it. By means of this corresponding geometric configuration and arrangement of rod-shaped inductor elements, an optimal hardening of the entire toothed rack can be obtained.

Another embodiment proposes that the inductor as a whole forms a mechanically rigid assembly. This means that the inductor with its inductor elements in this constructive assembly must first be positioned relative to the toothed rack to be hardened in order to subsequently perform the hardening process with appropriate electrical power supply of the inductor. The connecting elements between the individual inductor elements not only have the task to provide a mechanical connection but also preferably these connecting elements form the electrical connection between the inductor elements, be it in serial connection or in parallel connection.

In accordance with another embodiment the connecting elements are arranged between inductor elements that neighbor one another. This means that the inductor as a whole is very compact and, in particular, in case of the elongate tooth rack is moreover of a slim configuration and that primarily no unnecessary conducting paths must be bridged. By means of the transversely extending connecting elements the current flows in accordance with the inductor elements, viewed in longitudinal direction of the toothed rack, back and forth within the inductor, i.e., forward and back and again forward etc.

A further embodiment proposes that the inductor elements are connected by corresponding connecting elements electrically in serial connection. According to the course and arrangement of the inductor elements and the connecting elements, in this way an inductor results that is convoluted within itself and is matched to the contour of the toothed rack to be hardened. Alternatively, it is also possible to connect the inductor elements electrically in parallel. On the one hand, it is conceivable in this connection that the inductor elements are all connected to the same voltage source. On the other hand, it is also conceivable that the inductor elements are differently energized.

BRIEF DESCRIPTION OF THE DRAWINGS

One embodiment of an inductor according to the invention for induction hardening of metallic toothed racks will be disclosed in the following with the aid of the drawing. It is shown in:

FIG. 1 a view of the inductor for hardening toothed racks;
FIG. 2 a side view of the inductor in FIG. 1;
FIG. 3 a rear view of the inductor in FIG. 1;
FIG. 4 a view in longitudinal direction of the toothed rack.

DESCRIPTION OF PREFERRED EMBODIMENTS

The embodiment in FIGS. 1 to 4 shows an inductor for hardening a toothed rack 1. The inductor is comprised of a total of four elongate inductor elements 2 that extend parallel to the toothed rack 1. In this connection, two inductor elements 2 are positioned opposite one another relative to the tooth profile of the toothed rack 1 while two inductor elements 2 extend in the area of the back of the toothed rack 1.

Ends of the inductor elements 2 that neighbor one another are connected by connecting elements 3 mechanically as well as electrically. This means that the inductor elements 2 together with their connecting elements 3 are connected electrically in series wherein the current along the inductor elements 2, after passing through the respective connecting element 3, flows back and forth in longitudinal direction of the toothed rack 1.

LIST OF REFERENCE CHARACTERS

1 toothed rack
2 inductor element
3 connecting element

What is claimed is:

1. An inductor for induction hardening of a metallic rod-shaped toothed rack, wherein a first outer surface of the toothed rack provided with the teeth is substantially planar and a remaining second outer surface of the toothed rack in cross-section is profiled, wherein the inductor comprises an electrical power supply and a substantially rod-shaped first inductor element that extends parallel to a longitudinal axis of the toothed rack, which first inductor element extends across an entire length of the toothed rack to be hardened along the first outer surface provided with the teeth, the first inductor element connected to the electrical power supply and supplied with electrical power to harden the first outer surface of the toothed rack, and wherein the toothed rack and the inductor during the hardening process are arranged stationarily.

2. The Inductor according to claim 1, comprising two or more of said first inductor element connected to the electrical power supply and arranged parallel to one another at the first outer surface of the toothed rack provided with the teeth.

3. The inductor according to claim 1, comprising a substantially rod-shaped second inductor element connected to the electrical power supply and extending parallel to the longitudinal axis of the toothed rack, which second inductor element extends along the remaining second outer surface of the toothed rack and supplied with electrical power to harden the remaining second outer surface area of the toothed rack.

4. The inductor according to claim 3, comprising two or more of said second inductor element connected to the electrical power supply and arranged parallel to one another at the remaining second outer surface of the toothed rack.

5. The inductor according to claim 3, wherein the first and second inductor elements are connected to one another by connecting elements and form a mechanically rigid assembly.

6. The inductor according to claim 3, wherein the first and second inductor elements are connected electrically in series or electrically in parallel.

7. The inductor according to claim 3, wherein the first and second inductor elements are connected electrically in series or electrically in parallel.

8. The inductor according to claim 5, wherein the first and second inductor elements are substantially of same length and the first and second inductor elements that are directly neighboring one another are connected to one another at ends thereof by the connecting elements that extend transversely to the first and second inductor elements.

9. The inductor according to claim 8, wherein the first and second inductor elements are connected electrically in series by the connecting elements and current supplied by the electrical power source during hardening flows back and forth along the first and second inductor elements in longitudinal direction of the toothed rack.

* * * * *